(12) United States Patent
Hsieh et al.

(10) Patent No.: US 7,413,332 B2
(45) Date of Patent: Aug. 19, 2008

(54) LIGHT MODULE

(75) Inventors: Chin-Kun Hsieh, Hsinchu (TW); Chi-Chen Cheng, Chang Hua Hsien (TW)

(73) Assignee: AU Optronics Corp., Hsinchu (TW)

( * ) Notice: Subject to any disclaimer, the term of this patent is extended or adjusted under 35 U.S.C. 154(b) by 0 days.

(21) Appl. No.: 11/582,312

(22) Filed: Oct. 18, 2006

(65) Prior Publication Data

US 2007/0103932 A1    May 10, 2007

(30) Foreign Application Priority Data

Nov. 4, 2005    (TW) .............................. 94138810 A

(51) Int. Cl.
*F21V 7/04*    (2006.01)

(52) U.S. Cl. ...................... 362/612; 362/630; 362/631; 362/800

(58) Field of Classification Search ................. 362/217, 362/219, 561, 602, 612, 249, 630, 631, 654, 362/800
See application file for complete search history.

(56) References Cited

U.S. PATENT DOCUMENTS 6,346,777 B1 *    2/2002    Kim .......................... 315/185 S
2006/0114694 A1 *    6/2006    Cho et al. .................... 362/631

FOREIGN PATENT DOCUMENTS

JP    2003-195306 A    7/2003

* cited by examiner

*Primary Examiner*—Sandra L. O'Shea
*Assistant Examiner*—Meghan K. Duniwiddie
(74) *Attorney, Agent, or Firm*—Birch, Stewart, Kolasch & Birch, LLP

(57) ABSTRACT

The present invention disclosed a light module, which comprises a plurality of LED package units and a plurality of connecting units. Opposite sides of each of the LED package units has one connector respectively, and opposite sides of each of the connecting units has one connector respectively. The LED package unit and the connecting unit connect each other through the connectors. To vary the arrangement and the amount of the connecting units and the LED package units is to suit different dimensions of side light modules of liquid crystal displays with different luminosities.

3 Claims, 4 Drawing Sheets

LIGHT MODULE

BACKGROUND OF THE INVENTION (1) Field of the Invention

The invention relates to a light module, more particularly to a side light module applied to a liquid crystal display (LCD).

(2) Description of the Prior Art

Liquid crystal display (LCD) is well known to be applied to portable electronic products, such as notebook PCs, cell phones, digital cameras, digital video machines, and personal digital assistants (PDAs). But the liquid crystal display does not generate light by itself, hence, a light source is needed to LCD.

Normally, a backlight module has a light source, which is divided into two kinds of cold cathode fluorescent lamp (CCFL) and light emitting diode (LED). The light effect of CCFL is higher in order to meet the needs of colorization, high illumination, and larger products, but it is with a larger volume. The light effect of LED is lower than CCFL, and LED has the merits of light weight and volume, focused light path, longer life, low contamination, etc. Therefore, LED is more suitable to be a backlight module of the electronic products with power-saving and light weight and volume.

The backlight module is further divided into two types of a direct illumination backlight module generating light lower to the display and a side illumination backlight module generating light lateral to the display.

Please refer to FIG. 1, which illustrates a schematic exploded view of a backlight module of a LCD in prior arts. A LCD 1 includes a liquid crystal panel 11 and a backlight module 12. The backlight module 12 includes a LED module 13, a light guide 14, a frame 15, and a PCB 16. The LED module 13 includes two sets of LEDs 131 welded on a flexible printed circuit board 132. The circuit layout of the flexible printed circuit board 132 is to electrically connect the LEDs to a plurality of light-source driving elements (not shown in the figure) of the PCB 16.

The LCD 1 described above is applied to different types of electronic products. Different electronic products may need different dimensions of liquid crystal panels and different luminosities. Logically, there are different sorts of flexible printed circuit boards to cooperate with the LEDs during production flows. Hence, such accommodations for the production flows shall waste time and materials. As a conclusion, to develop a side light module for easy installment to be adjusted in the dimensions of the module may be put more effort continuously.

SUMMARY OF THE INVENTION

Accordingly, the objective of the present invention is to provide a light module, which is applied to a LCD to work as a backlight module.

Another objective of the present invention is to provide a light module, which is applied to liquid crystal panels with different dimensions.

Another objective of the present invention is to provide a light module, which brightness can be adjusted to match up the demands of different panels.

The present invention discloses a light module, which comprises a plurality of LED package units and a plurality of connecting units. opposite sides of each of the LED package units has one connector respectively and opposite sides of each of the connecting units has one connector respectively. The LED package unit and the connecting unit connect each other through the connectors. To vary the arrangement and the amount of the connecting units and the LED package units is to suit different dimensions of side light modules of liquid crystal displays with different luminosities.

In one embodiment of the present invention, the connectors are individually a plug and a socket. The connectors electrically connect each other through the ways of: copper wires and connecting nodes.

BRIEF DESCRIPTION OF THE DRAWINGS

The present invention will now be specified with reference to its preferred embodiment illustrated in the drawings, in which.

DESCRIPTION OF THE PREFERRED EMBODIMENT

The present invention relates to a light module of the LCD, wherein the light module has an adjustable light source for different panels with different dimensions.

Figure 1:
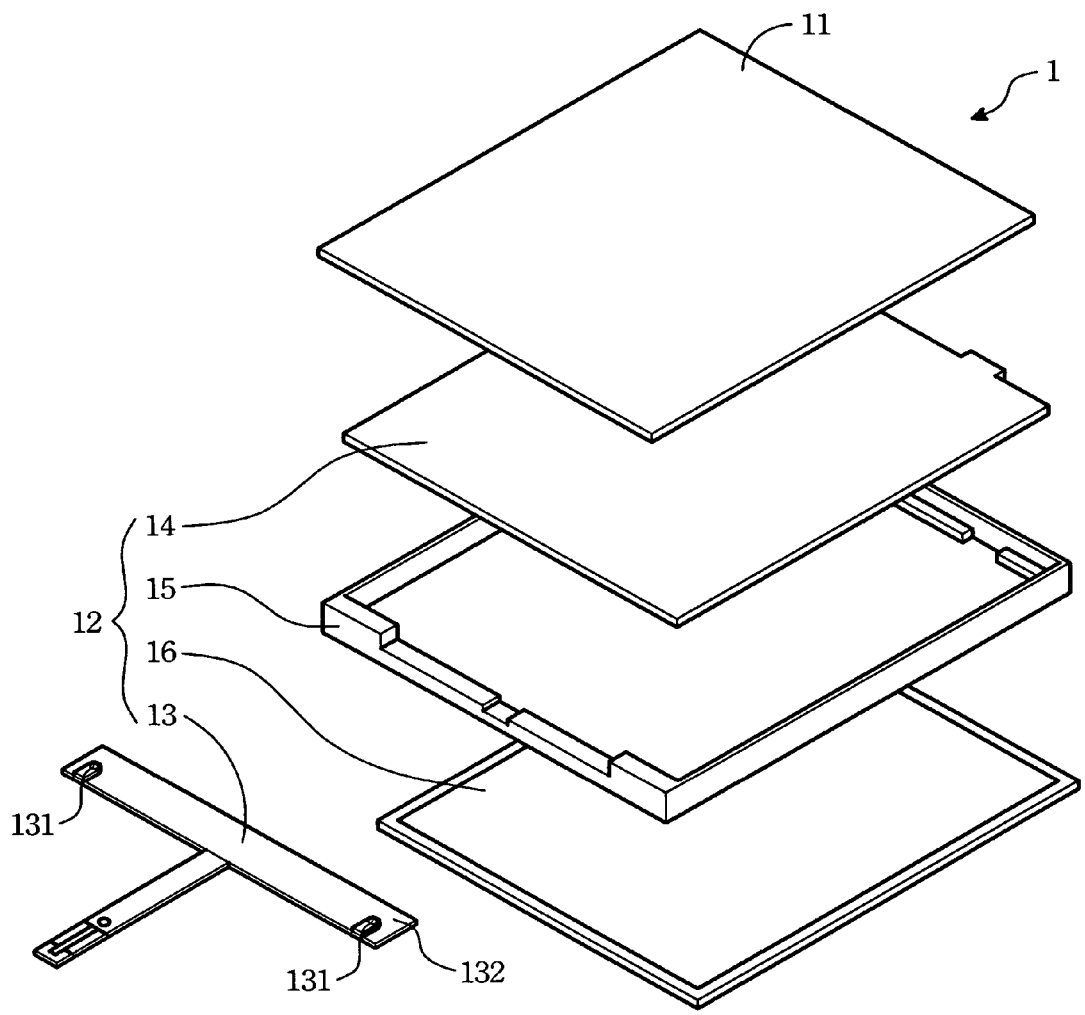
FIG. 1 illustrates a schematic exploded view of a backlight module of a LCD in prior arts.
Figure 2:
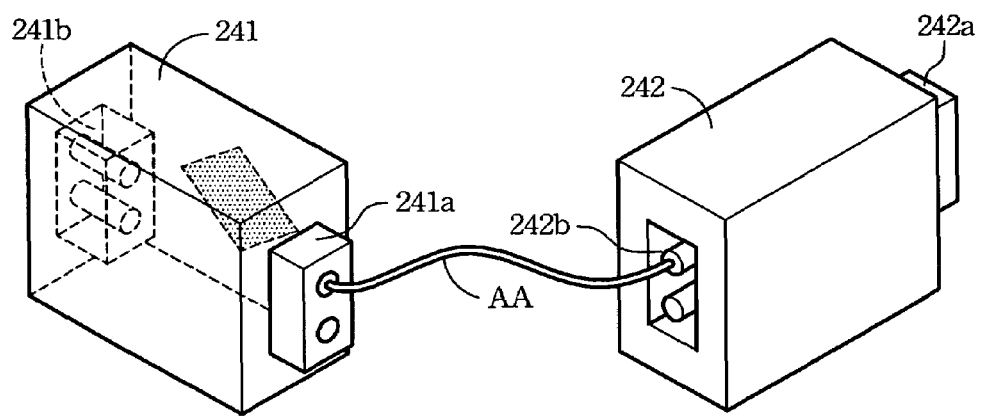
FIG. 2A illustrates a schematic view of a first preferred embodiment of a connection of the present invention.
FIG. 2B illustrates a schematic view of a second preferred embodiment of the connection of the present invention.
Figure 2:
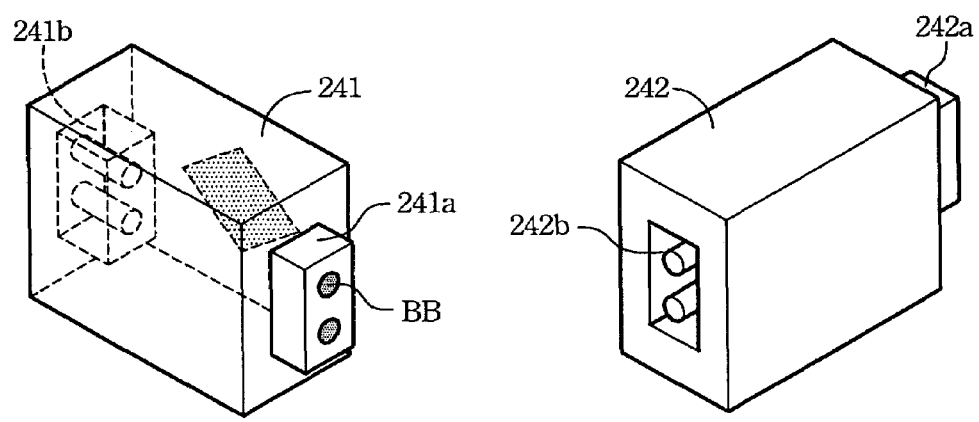

The light module of the present invention comprises a plurality of LED package units and a plurality of connecting units. Opposite sides of each of the LED package units has one connector respectively, and opposite sides of each of the connecting units having one connector respectively. The LED package unit and the connecting package unit connect each other through the connectors. The connectors could electrically connect each other through the ways of: copper wires and connecting nodes. In one embodiment of the present invention, the two connectors of the two sides of the LED package units are a plug and a socket. Please refer to FIG. 2A and FIG. 2B, which illustrate a schematic view of a first preferred embodiment of a connection of the present invention and a schematic view of a second preferred embodiment of the connection of the present invention. The connectors 241a and 241b of the LED package unit 241 and the connectors 242a and 242b of the connecting package unit 242 are two plugs and two sockets individually. That is, the connectors 241a and 242a are sockets and the connectors 241b and 242b are plugs. The electrical connection between the connectors 241a and 242b may through copper wires AA, as shown in FIG. 2A or connecting nodes BB, as shown in FIG. 2B.

Figure 3:
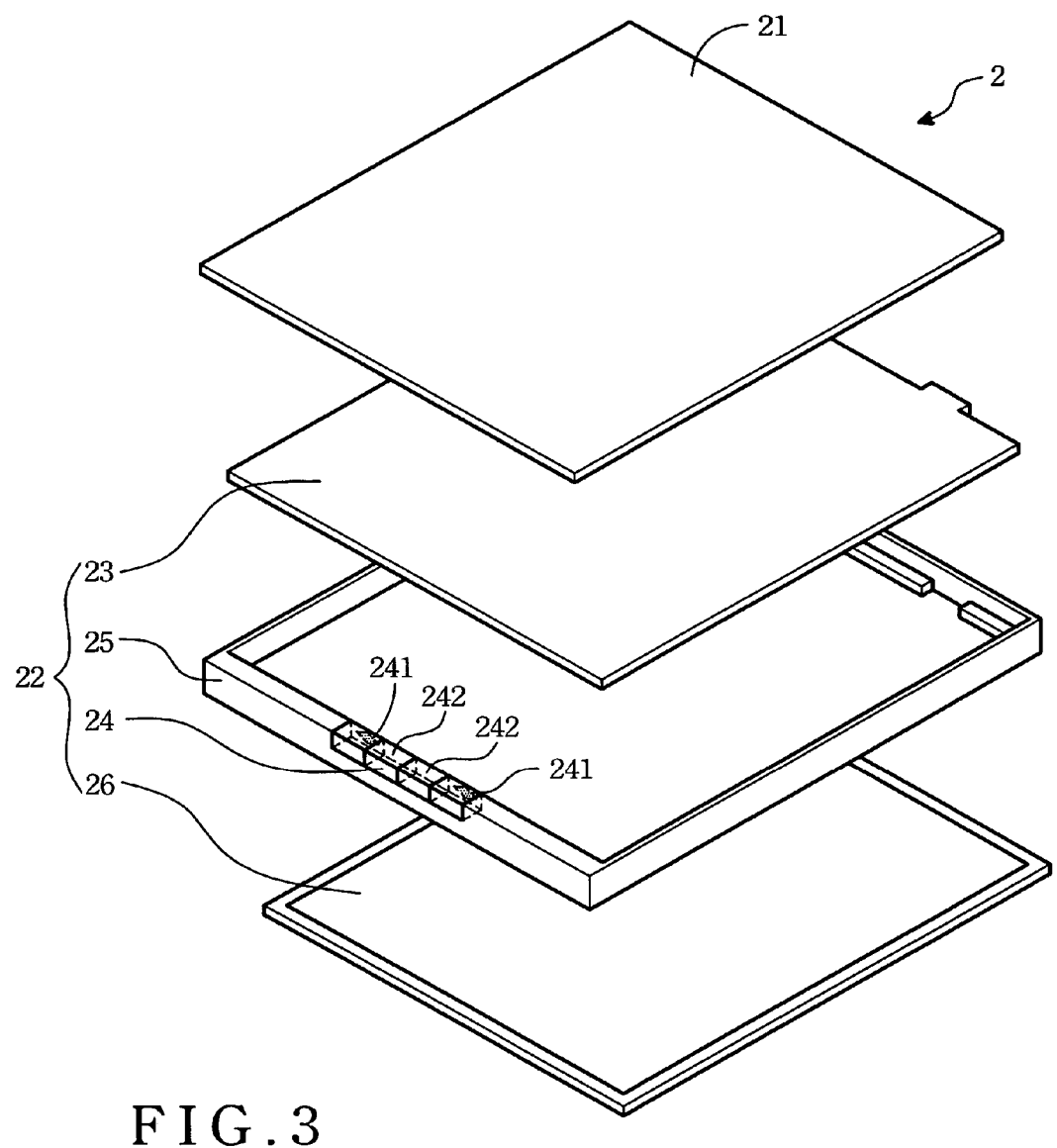
FIG. 3 illustrates a schematic exploded view of a preferred embodiment of a light module applied to a LCD of the present invention.

The light module of the present invention provides a new mode connecting units. To vary the arrangement and the amount of the connecting units and the LED package units is to suit different dimensions of side light modules of liquid crystal displays with different luminosities Please refer to FIG. 3, which illustrates a schematic exploded view of a preferred embodiment of the light module applied to a LCD of the present invention. A LCD 2 includes a display panel 21 and a backlight module 22. The backlight module 22 includes a light guide 23, a side light source 24, a frame 25, and a PCB 26. The side light source 24 is disposed on one side of the frame 25 and further includes a plurality of LED package units 241 and a plurality of connecting units 242. Two sides of each of the LED package units 241 and Two sides of each of the connecting units 242 has the connectors 241a, 241b, 242a, and 242b, shown as in FIG. 2A and FIG. 2B. The LED package units 241 includes a LED and structures for electric connection, the structures can be copper wires or connecting nodes. Every single connecting unit 242 is used for the electrical connection among the LED package units 241 through the connectors.

Figure 4:
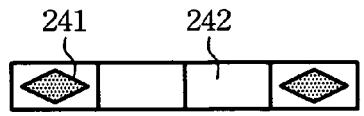
FIG. 4A illustrates a schematic view of a first preferred embodiment of an arrangement of connecting units and LED package units of the present invention.
FIG. 4B illustrates a schematic view of a second preferred embodiment of the arrangement of the connecting units and the LED package units of the present invention.
FIG. 4C illustrates a schematic view of a third preferred embodiment of the arrangement of the connecting units and the LED package units of the present invention.
Figure 4:
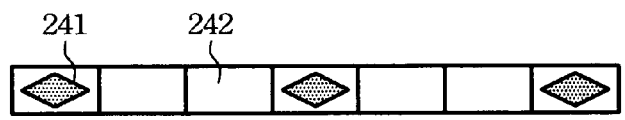
Figure 4:
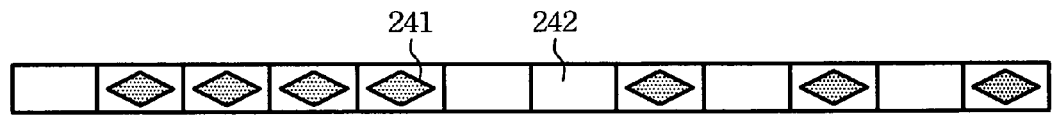

Accordingly, different arrangement of the LED package units 241 and the connecting units 242 could result in various luminosities and dimensions of light sources of side light modules. Please refer to FIG. 4A~FIG. 4C, which illustrate a schematic view of a first preferred embodiment of an arrangement of the connecting units and the LED package units of the present invention, a schematic view of a second preferred embodiment of an arrangement of the connecting units and the LED package units of the present invention, and a schematic view of a third preferred embodiment of an arrangement of the connecting units and the LED package units of the present invention. Under the condition of a panel being equipped with only two sets of LEDs, the arrangement of two sets of LED package units 241 and a plurality of connecting units is formed as the side light source as shown in FIG. 4A. While the larger dimensional demand or the brighter brightness demand of a panel, more LED package units or connecting units can be added easily so as to enlarge the dimensions of the side light module. Please refer to FIG. 4B, which shows an embodiment that adding both the quantities of the LED package units and the connecting units to get a larger panel. Not only the dimensions are adjustable easily, but the brightness density demands can be meet for the present invention. Please refer to FIG. 4C, which illustrates that one side needs more light sources. Therefore, the side requiring more brightness is equipped with the LED package units 241, and another side is then installed more connecting units 242.

Comparing to the side light module in prior arts, the side light module of the present invention can electrically connect the light sources with the arrangement of FPC (flexible printed circuit). The light sources in the present invention may electrically connect to the drivers of the PCB by welding wires on the LED package units or the connecting units of two sides of the side light module and connecting the wires to the PCB. The PCB is selected by the group of hard PCB, flexible PCB, metal frame copper, and metal layer coated printed circuits.

As a conclusion, the present invention provides a light module which is capable of regulating the dimensions and the luminosities thereof to meet different panels rather than welding flexible printed circuit boards. therefore, not only the manufacture process is simplified, but the cost is saved. Furthermore, the FPC between the PCD and the light source in the related art is omitted, and the fabrication of the light module in the present invention may be completed on an original mold.

While the present invention has been particularly shown and described with reference to preferred embodiments, it will be understood by those skilled in the art that various changes in form and detail may be without departing from the spirit and scope of the present invention.

What is claimed is:

1. A LCD comprising:
    a display panel;
    a printed circuit board (PCB);
    a light guide; and
    a light module being electrically connected to the display panel and the printed circuit board (PCB) and disposed therein, the light module further comprising:
    a plurality of LED package units disposed on one side of the light guide, opposite sides of each of the LED package units having one connector respectively, wherein the two connectors of the two sides of the LED package units are a plug and a socket, and
    a plurality of connecting units, opposite sides of each of the connecting units having one connector respectively, wherein the LED package unit and the connecting unit connect each other through the connectors.

2. The LCD according to claim 1, wherein the connectors electrically connect each other through the ways from the group of: copper wires and connecting nodes.

3. The LCD according to claim 1, wherein the two connectors of the two sides of the connecting units are a plug and a socket.

* * * * *